United States Patent [19]

Petrov

[11] 4,099,903

[45] Jul. 11, 1978

[54] CORE FOR DEEP DRAW MOLDING A CLOSURE CAP FOR BOTTLES AND THE LIKE

[76] Inventor: Zafir Petrov, Akazienweg 5-A, D-6710 Frankenthal, Fed. Rep. of Germany

[21] Appl. No.: 786,891

[22] Filed: Apr. 12, 1977

[30] Foreign Application Priority Data

Apr. 15, 1976 [DE] Fed. Rep. of Germany ... 7611954[U]
Jun. 3, 1976 [DE] Fed. Rep. of Germany ....... 2624969

[51] Int. Cl.² .......................... B29C 17/04; B29D 1/00
[52] U.S. Cl. ..................................... 425/388; 425/438; 249/59; 215/329; 264/90; 264/92; 264/94; 264/334
[58] Field of Search ................... 425/388, 438; 249/59

[56] References Cited

U.S. PATENT DOCUMENTS

| 2,306,205 | 12/1942 | Crosonan | 425/438 X |
|---|---|---|---|
| 2,391,527 | 12/1945 | Tracy | 249/59 X |
| 2,395,209 | 2/1946 | Zesbaugh | 249/59 X |
| 2,799,049 | 7/1957 | Wilson | 425/438 |
| 2,992,577 | 7/1961 | Marxen | 425/438 X |
| 3,481,000 | 12/1969 | Bärfuss | 425/438 X |
| 3,584,092 | 6/1971 | Alexandris | 249/59 X |
| 3,584,111 | 6/1971 | Allison | 425/438 X |
| 3,651,185 | 3/1972 | Menkel | 249/59 X |
| 3,759,652 | 9/1973 | Childs et al. | 425/388 |

*Primary Examiner*—J. Howard Flint, Jr.
*Attorney, Agent, or Firm*—Bacon & Thomas

[57] ABSTRACT

A bottle cap is constructed with stepped portions, including a large diameter serrated lower portion, an intermediate diameter threaded portion, and a smaller diameter serrated upper portion. The cap is produced by deep drawing on a mold core having a base portion carrying a pedestal, to which a thread-forming portion is rigidly secured. A large diameter, lower serration-forming portion and a small diameter, upper serration-forming portion are rotatably mounted on the pedestal below and above the thread-forming mold portion, respectively. After the bottle cap is formed the pedestal is rotated, to disengage the completed cap from the mold core.

5 Claims, 3 Drawing Figures

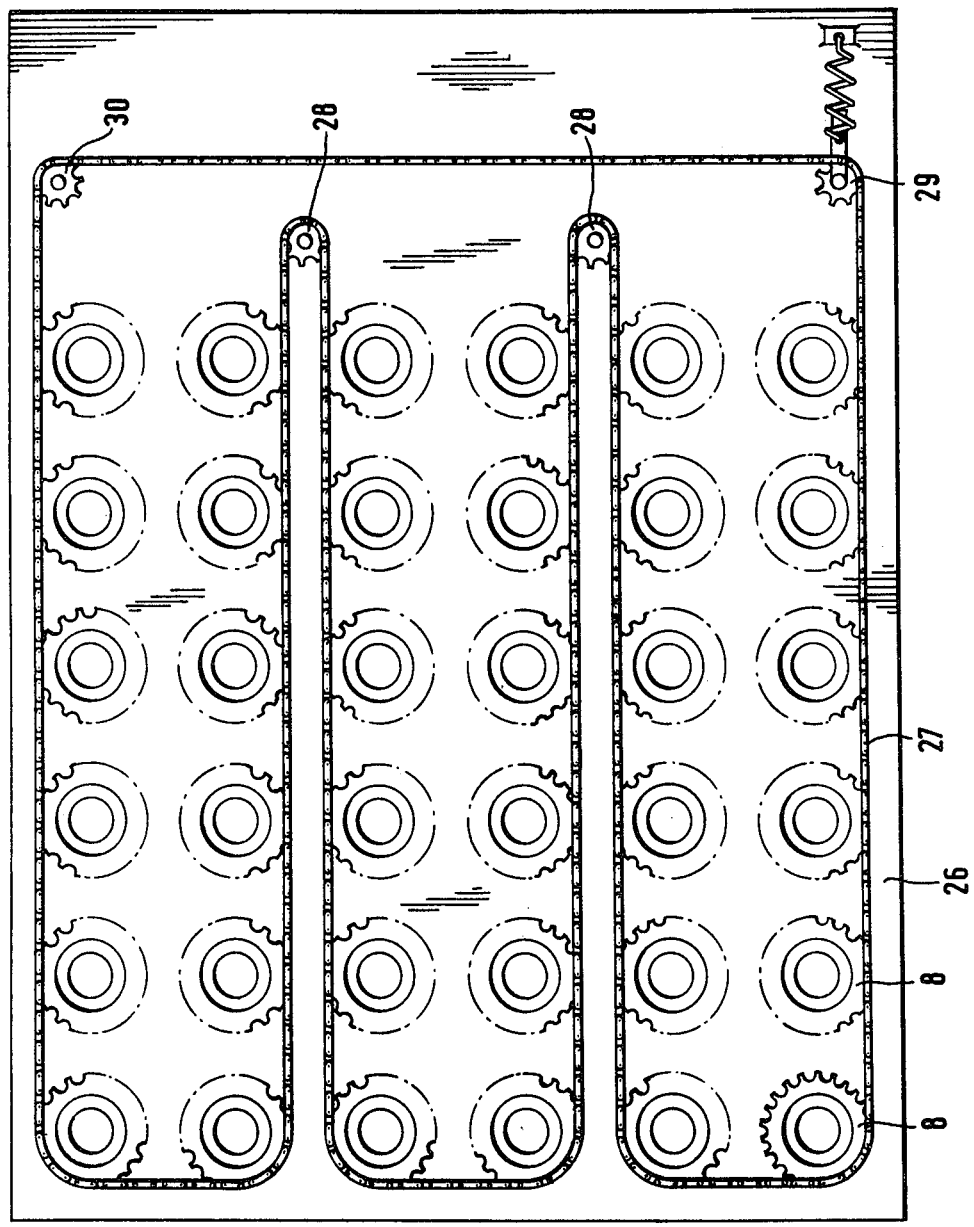

CORE FOR DEEP DRAW MOLDING A CLOSURE CAP FOR BOTTLES AND THE LIKE

BACKGROUND OF THE INVENTION

1. Field of the Invention

The invention relates generally to mold apparatus for making closure caps for bottles and the like, of the kind having at least one serrated portion and a threaded portion. More particularly, it relates to a unique mold core for use in forming a stepped closure cap by a deep drawing process.

2. Description of the Prior Art

Closure caps of the same general kind as that of the invention are known. They generally consist of a blank formed from an aluminum sheet, which has a thread rolled therein after the closure cap blank is put on the threaded neck opening of a bottle.

Apart from the fact that such a closure cap requires considerable material and the process for making and installing it is complicated, it must be noted that the thread on the neck of the bottle usually deviates from the ideal circular shape, so that an absolute seal of the closure is often not provided, especially for carbonated beverages. There is need for a cap closure which is directly produced in its final form, which seals effectively when installed, and which can be made of synthetic material or the like. The present invention is directed to satisfying that need.

SUMMARY OF THE INVENTION

The closure cap is stepped, so that it becomes smaller towards the top. This enables the cap to be produced in its final form by deep drawing from a foil of suitable synthetic material or the like, on a mold core.

The process for the production of the present closure cap is characterized by the fact that a foil of suitable synthetic material is deep drawn on a mold, provided with the mold core of the invention. The mold core has stepped portions, including an intermediate diameter thread-forming portion that is rotatable relative to the rest of the core, whereby the completed cap can be easily removed therefrom. The deep drawing can be carried out with the aid of pressure, and/or vacuum.

In the invention the mold core is rotatably supported in a recess of the mold, and is arranged so that it can be actuated and rotated from the underside of the mold. The mold core includes a base portion having a pedestal thereon, and a large diameter lower core portion is rotatably mounted on the pedestal for forming the lower, serrated portion of the closure cap. The intermediate thread-forming core portion is fixed to the pedestal above the large lower, serration-forming core portion, and a small diameter, upper serration-forming core portion is rotatably mounted on the pedestal above the thread-forming portion.

The pedestal is made in pieces in the preferred embodiment of the invention, secured together by screws, so that that the serration-forming core portions can be rotatably mounted thereon. In the preferred embodiment of the invention the pedestal is made hollow and is capable of being connected to a vacuum, and radial nozzle holes are provided at least in the region of the threaded core portion, and preferably in the serration-forming portions also.

The base portion of the core has a sprocket on its lower end, and is mounted in a mold plate along with other mold cores. All of the mold cores are connected by a drive chain operated by a drive motor, so that they can be simultaneously rotated for removing completed closure caps therefrom.

It is the principal object of the invention to provide a mold apparatus for making a stepped, completely formed closure cap for soft drink bottles and the like, adapted to be threaded into place and to form an effective seal.

Another object is to provide an apparatus for making a stepped closure cap, in finished form, and separate from the bottle upon which it is to be used.

Yet another object is to provide a mold core for making a stepped closure cap, wherein the completed cap can be easily removed from the core merely by rotating it relatively to the core, to unthread it therefrom.

Other objects and many of the attendant advantages will become readily apparent from the following Description of the Preferred Embodiment, when taken in conjunction with the accompanying drawings.

BRIEF DESCRIPTION OF THE DRAWINGS

FIG. 3 is a view of the underside of a mold provided with a plurality of mold cores, showing the chain and sprocket arrangement for effecting simultaneous rotation thereof.

DESCRIPTION OF THE PREFERRED EMBODIMENT

Figure 1:
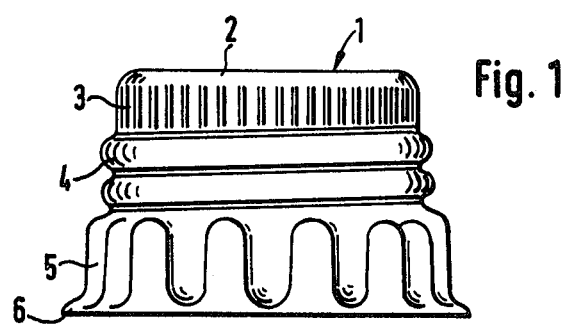
FIG. 1 is a side elevational view of the closure cap of the invention, showing the stepped configuration thereof.

Referring now to FIG. 1 of the drawing, the stepped closure cap of the invention is indicated generally at 1, and includes a cover or upper wall 2, an upper, axially serrated portion 3 of relatively small diameter, an intermediate threaded portion 4 of intermediate diameter, and a large diameter lower serrated portion 5. The serrations on the portion 5 also are axial, and said portion terminates in a dished, smooth annular edge 6. Each of the portions 3, 4 and 5 is so configured that the respective superposed portion has a smaller diameter, with the upper portion 3 having an external diameter smaller than the internal diameter of the threaded intermediate portion 4. This stepped arrangement makes it possible to remove the closure cap 1 from the mold core upon which it is formed, without the necessity of an axial partition of dismantling of the core.

Deep drawing processes for producing a closure cap of this type are known. A foil of suitable synthetic or other material is placed on a mold having appropriately configured mold cores thereon, and the foils are brought into contact with their respective mold cores with the application of heat, pressure, and/or vacuum. In the invention, however, removal of the completed closure caps is effected without the usual dismantling of the mold cores. To accomplish this, the stepped mold core of the invention is constructed so that the portion thereof utilized to form the thread portion of the stepped closure cap can be rotated, while the core portions utilized to form the upper and lower serrated cap portions remain relatively stationary. Removal is effected by simply rotating the threaded mold core portions, after which the completed caps can be separated from any remainder of the foil from which they are made.

Figure 2:
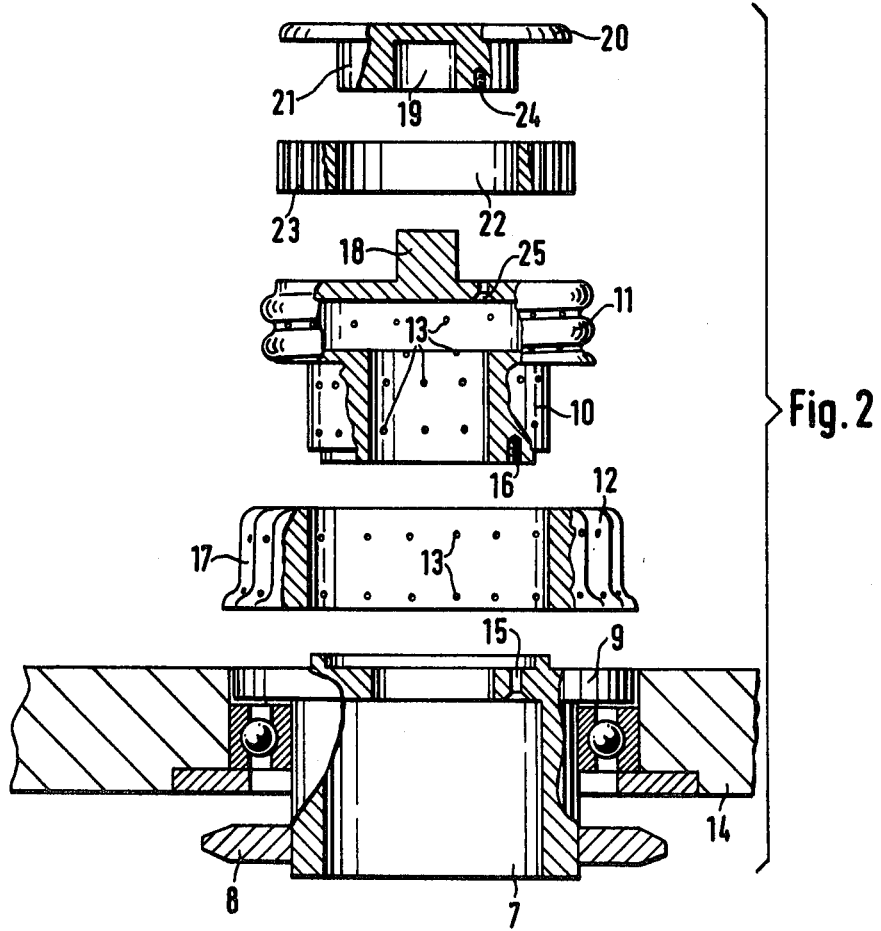
FIG. 2 is an exploded view of the mold core of the invention, with the elements thereof partly broken away to illustrate the construction details thereof.

Referring now to FIGS. 2 and 3, the mold core of the invention is carried on the mold 14, and includes a base portion 7 comprising a hollow cylinder, to the lower end of which a chain sprocket 8 is mounted. The upper end of the base portion 7 has a plate 9 thereon, to which a central core portion 10 is attached, the portion 10 having a thread form 11 thereon. The central core portion 10 has a lower cylindrical portion on which an annular ring 12 is rotatably mounted, the ring 12 having an array of axial serration forms 17 thereon.

The central core portion 10, like the base portion 7, is hollow, and both portions have radial nozzle holes 13 therein, which extend to the thread-forming portion 11. The serration-forming ring 12 also has radial nozzle holes 13 therein, with a nozzle hole 13 leading to each individual axial serration 17.

The core base portion 7 is rotatably supported in an opening of the deep drawing mold 14 by suitable bearing means, and is connected to the central core portion 10 by screws. Screw holes 15 are provided in the upper end of the base portion 7, and are alignable with corresponding threaded holes 16 in the lower face of the central portion 10.

The central portion 10 is closed at the top, and carries an axial stud 18 thereon with a diameter corresponding to a cavity 19 provided in a cover 20. The cover portion 20 of the core includes a cylindrical lower portion 21, on which a small diameter serration-forming ring 22 is carried, the ring 22 having axial serration forms 23 thereon. Threaded holes 24 in the lower face of the upper core portion 20 are alignable with corresponding screw holes 25 in the central portion 11, and are used to receive screws for securing the elements together.

The central portion 10 and the upper portion 20 of the mold core form a pedestal, on which the annular serration-forming rings 12 and 22 are rotatably mounted. Because of this rotatable mounting, the ring portions 12 and 22 need not rotate with the threaded central portion 10, so that the axially serrated zones or portions of a completed closure cap will not be destroyed during removal of the threaded cap portion 4 from its thread-forming mold portion 11.

As shown in FIG. 3, a number of the mold cores are arranged on a common mold 26, with their chain sprockets 8 disposed below the mold plate 14. The sprockets 8 of all the mold cores are interconnected by a drive chain 27, with the chain being guided over the guide sprockets 28, a tightener 29, and a drive sprocket 30, so that all the mold cores are rotatable in the same direction and at the same time by movement of the drive chain.

In the present process, the foil blanks are placed on the mold cores of the deep drawing mold plate 14, and the closure caps are formed, in the usual way by deep drawing. Thereafter, the chain 27 is activated while the completed closure caps 1 are held against rotation, whereupon the thread-forming central portions of the mold cores are threaded out of the completed caps. Because the lower serrated portion 5 of each cap is of larger diameter than the threaded intermediate portion 4, the thread-forming central core portion 11 is easily withdrawn therethrough. Similarly, because the upper serrated cap portion 3 has an external diameter smaller than the internal diameter of the threaded intermediate cap portion 4, the upper serration-forming ring 22 of the core can be withdrawn through the threaded intermediate cap portion 4 without causing damage thereto.

The present invention provides for the easy and rapid production of completed screw closure caps, with a minimum wastage of material, and with the opportunity for using less expensive synthetic materials for the cap. Because the closure cap of the invention is not rolled on the threads of a bottle neck, the structural characteristics of the material used for the cap is not so important in the invention as in prior caps where such rolling was required. Further, in the present invention a threaded formation of uniform size and configuration is assured for every closure cap, which helps ensure a tight, sealing fit on the container neck.

Obviously, many modifications and variations of the invention are possible.

What is claimed is:

1. In an apparatus for forming a stepped closure cap, a mold core, comprising:
   a rotatably mounted base portion;
   an intermediate thread-forming portion secured to said base portion; and
   at least one serration-forming portion mounted for rotation relative to said base portion and said thread-forming portion, said mold core being stepped in diameter, with the largest diameter being toward the bottom thereof.

2. In an apparatus for forming a stepped closure cap as recited in claim 1, wherein said mold core is hollow and is connectable to a vacuum source, the side walls of said thread-forming portion and said serration-forming portion having nozzle openings therethrough leading to the hollow interior of said mold core.

3. An apparatus for use in molding a stepped closure cap from a blank of material, including:
   a mold plate;
   at least one mold core rotatably carried by said mold plate, and including:
   a base portion rotatable relative to said mold plate, and having a pedestal thereon;
   a thread-forming portion fixed centrally to said pedestal;
   a lower serration-forming annular ring rotatably received on said pedestal beneath said thread-forming portion, said lower annular ring having a minimum external diameter greater than the maximum external diameter of said thread-forming portion; and
   an upper serration-forming annular ring rotatably received on said pedestal above said thread-forming portion, and having a maximum external diameter less than the minimum external diameter of said thread-forming portion; and
   means effective to rotate said pedestal and said thread-forming portion relative to said upper and said lower serration-forming rings.

4. An apparatus as recited in claim 3, wherein said mold plate carries a plurality of said mold cores, each mold core having a sprocket gear on the lower end thereof extending beneath said mold plate, and wherein all of said sprocket gears are interconnected by drive chain means to effect simultaneous rotation of all of said mold core pedestals.

5. An apparatus as recited in claim 3, wherein said mold core pedestal is hollow and is connectable to a source of vacuum, and wherein the walls of said pedestal, said thread-forming portion and said upper and lower serration-forming annular rings have nozzle openings extending therethrough.

* * * * *